(12) United States Patent
Bian et al.

(10) Patent No.: US 11,927,801 B2
(45) Date of Patent: Mar. 12, 2024

(54) STACKED WAVEGUIDE CORES WITH TUNABLE PHASE DELAY

(71) Applicant: GlobalFoundries U.S. Inc., Malta, NY (US)

(72) Inventors: Yusheng Bian, Ballston Lake, NY (US); Abdelsalam Aboketaf, Essex Junction, VT (US)

(73) Assignee: GlobalFoundries U.S. Inc., Malta, NY (US)

( * ) Notice: Subject to any disclaimer, the term of this patent is extended or adjusted under 35 U.S.C. 154(b) by 43 days.

(21) Appl. No.: 17/880,006

(22) Filed: Aug. 3, 2022

(65) Prior Publication Data
US 2024/0045142 A1 Feb. 8, 2024

(51) Int. Cl.
G02B 6/126 (2006.01)
G02B 6/12 (2006.01)
G02B 6/132 (2006.01)

(52) U.S. Cl.
CPC ......... *G02B 6/126* (2013.01); *G02B 6/12002* (2013.01); *G02B 6/132* (2013.01); *G02B 2006/1215* (2013.01)

(58) Field of Classification Search
None
See application file for complete search history.

(56) References Cited

U.S. PATENT DOCUMENTS

| | | | |
|---|---|---|---|
| 6,122,416 A * | 9/2000 | Ooba | G02F 1/3132 398/1 |
| 6,366,730 B1 * | 4/2002 | Cappuzzo | G02F 1/011 385/147 |
| 6,949,392 B2 * | 9/2005 | Gill | G02B 6/12007 438/31 |
| 10,509,244 B1 | 12/2019 | Shank et al. | |
| 10,649,245 B1 | 5/2020 | Bian et al. | |
| 10,684,530 B1 | 6/2020 | Bian et al. | |
| 10,747,030 B1 | 8/2020 | Bian et al. | |
| 10,816,872 B1 | 10/2020 | Bian et al. | |
| 10,895,689 B2 | 1/2021 | Bian et al. | |
| 10,996,398 B1 | 5/2021 | Bian et al. | |
| 11,092,740 B1 * | 8/2021 | Bian | G02B 6/126 |
| 11,105,978 B2 * | 8/2021 | Bian | G02B 6/107 |
| 11,221,506 B2 | 1/2022 | Shank et al. | |
| 11,644,620 B2 * | 5/2023 | Bian | G02B 6/125 385/11 |
| 2020/0166709 A1 | 5/2020 | Bian et al. | |

(Continued)

OTHER PUBLICATIONS

A. Melloni et al., "Tunable Delay Lines in Silicon Photonics: Coupled Resonators and Photonic Crystals, a Comparison," in IEEE Photonics Journal, vol. 2, No. 2, pp. 181-194, Apr. 2010, doi: 10.1109/JPHOT.2010.2044989.

(Continued)

*Primary Examiner* — Rhonda S Peace

(74) *Attorney, Agent, or Firm* — Thompson Hine LLP; Anthony Canale

(57) ABSTRACT

Structures for a waveguide core and methods of forming such structures. The structure comprises a stacked waveguide core including a first waveguide core and a second waveguide core stacked with the first waveguide core, and a layer adjacent to the stacked waveguide core. The layer comprises a material having a refractive index that is variable in response to a stimulus.

20 Claims, 9 Drawing Sheets

(56) References Cited

U.S. PATENT DOCUMENTS

| | | | |
|---|---|---|---|
| 2021/0278742 A1 | 9/2021 | Bian et al. | |
| 2023/0055077 A1* | 2/2023 | Shi | G02F 1/212 |
| 2023/0333440 A1* | 10/2023 | Aimone | G02B 6/12002 |

OTHER PUBLICATIONS

Saeed Khan, Mohammad Amin Baghban, and Sasan Fathpour, "Electronically tunable silicon photonic delay lines," Optics Express 19, 11780-11785 (2011).

Xinyi Wang et al., "Continuously tunable ultra-thin silicon waveguide optical delay line," Optica 4, 507-515 (2017).

Xingchen Ji et al., "On-chip tunable photonic delay line," APL Photonics, vol. 4, Issue 9; 090803 (2019); https://doi.org/10.1063/1.5111164.

Keisuke Shibuya et al., "Silicon waveguide optical modulator driven by metal-insulator transition of vanadium dioxide cladding layer," Optics Express 27, 4147-4156 (2019).

Arash Joushaghani et al., "Wavelength-size hybrid Si-VO2 waveguide electroabsorption optical switches and photodetectors," Optics Express 23, 3657-3668 (2015).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.

B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th3I.4.

Y. Bian et al., "Monolithically integrated silicon nitride platform," 2021 Optical Fiber Communications Conference and Exhibition (OFC), pp. 1-3 (2021).

A. Aboketaf et al., "Towards fully automated testing and characterization for photonic compact modeling on 300-mm wafer platform," 2021 Optical Fiber Communications Conference and Exhibition (OFC), 2021, pp. 1-3.

Y. Bian et al., "Light manipulation in a monolithic silicon photonics platform leveraging 3D coupling and decoupling," in Frontiers in Optics / Laser Science, B. Lee, C. Mazzali, K. Corwin, and R. Jason Jones, eds., OSA Technical Digest (Optica Publishing Group, 2020), paper FTu6E.3.

Y. Bian et al., "3D silicon photonic interconnects and integrated circuits based on phase matching," 2021 IEEE 71st Electronic Components and Technology Conference (ECTC), 2021, pp. 2279-2284, doi: 10.1109/ECTC32696.2021.00357.

Bian, Yusheng et al., "Switchable Polarization Rotators" filed May 24, 2021 as a U.S. Appl. No. 17/328,048.

* cited by examiner

STACKED WAVEGUIDE CORES WITH TUNABLE PHASE DELAY

BACKGROUND

The disclosure relates to photonics chips and, more specifically, to structures for a waveguide core and methods of forming such structures.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

Waveguides may suffer from time/group delay between transverse electrode mode and transverse magnetic mode polarizations because of differences in group indices (i.e., group velocities) for light propagation. Light of the different polarization modes essentially travels at different speeds when guided by a birefringent optical medium, such as the material constituting the waveguide core of the waveguide, that is characterized by polarization-dependent refractive indices. The resulting time/group delay, which may be on the order of only a few picoseconds, may have particularly significance for waveguides deployed in high-speed data communication systems.

Improved structures for a waveguide core and methods of forming such structures are needed.

SUMMARY

In an embodiment of the invention, a structure comprises a stacked waveguide core including a first waveguide core and a second waveguide core stacked with the first waveguide core, and a layer adjacent to the stacked waveguide core. The layer comprises a material having a refractive index that is variable in response to a stimulus.

In an embodiment of the invention, a method comprises forming a stacked waveguide core including a first waveguide core and a second waveguide core stacked with the first waveguide core, and forming a layer adjacent to the stacked waveguide core. The layer comprises a material having a refractive index that is variable in response to a stimulus.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
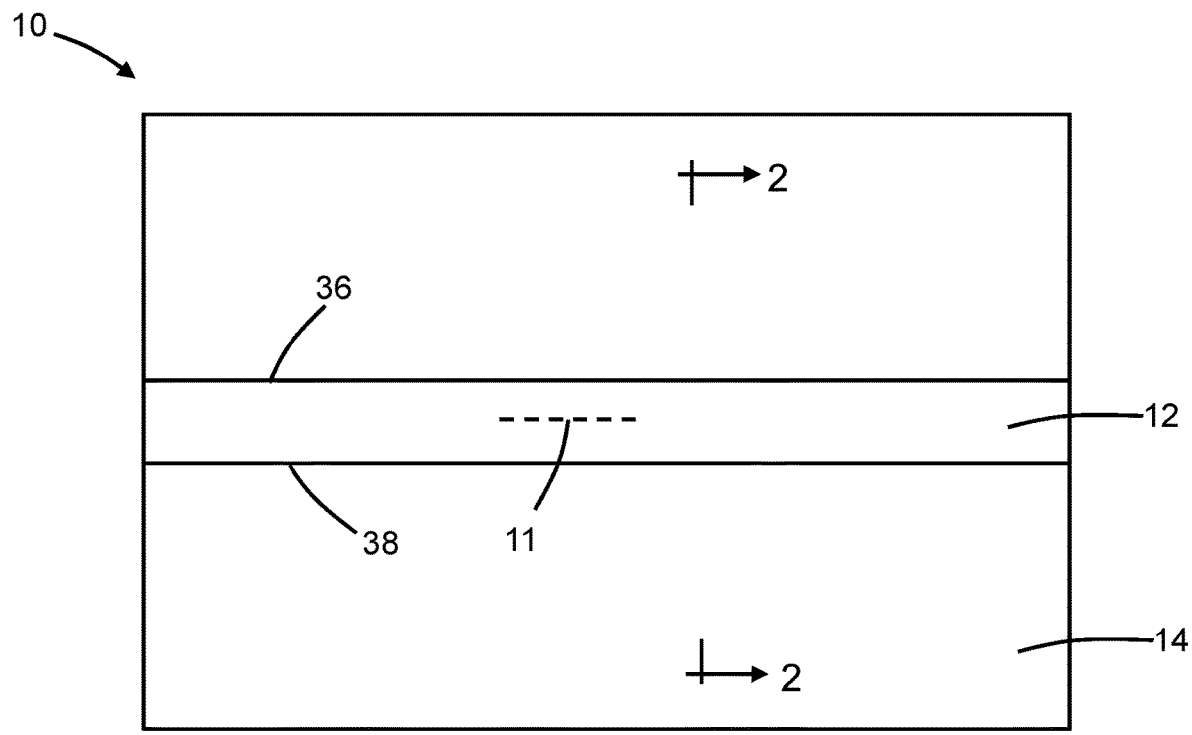
FIG. 1 is a top view of a structure at an initial fabrication stage of a processing method in accordance with embodiments of the invention.
Figure 2:
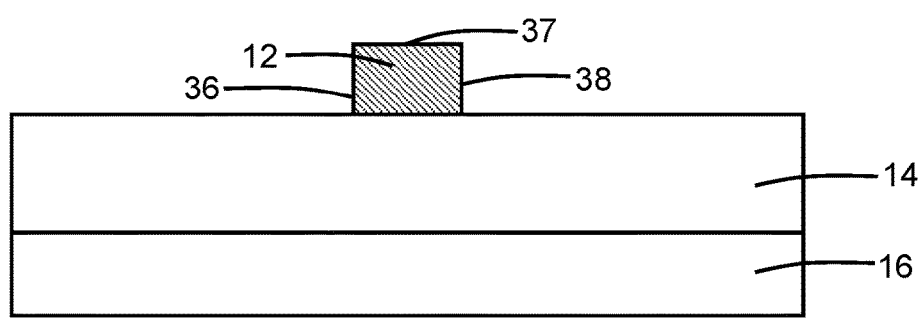
FIG. 2 is a cross-sectional view taken generally along line 2-2 in FIG. 1.

With reference to FIGS. 1, 2 and in accordance with embodiments of the invention, a structure 10 includes a waveguide core 12 that is positioned on a dielectric layer 14 and a substrate 16 that is positioned below the dielectric layer 14. The waveguide core 12 may be aligned along a longitudinal axis 11. The waveguide core 12 may have a side surface 36, an opposite side surface 38, and a top surface 37 connecting the side surfaces 36, 38. In an embodiment, the side surfaces 36, 38 define sidewalls that may extend from the top surface 37 to the dielectric layer 14.

In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate, and the dielectric layer 14 may separate the waveguide core 12 from the substrate 16. In an alternative embodiment, one or more additional dielectric layers comprised of a dielectric material, such as silicon dioxide, may be positioned between the dielectric layer 14 and the waveguide core 12. In an alternative embodiment, the substrate 16 may include an undercut or cavity beneath the waveguide core 12.

In an embodiment, the waveguide core 12 may be comprised of a material having a refractive index that is greater than the refractive index of silicon dioxide. In an embodiment, the waveguide core 12 may be comprised of a semiconductor material, such as single-crystal silicon or polysilicon. In an alternative embodiment, the waveguide core 12 may be comprised of a dielectric material, such as silicon nitride. In an alternative embodiment, the waveguide core 12 may be comprised of silicon oxynitride. In alternative embodiments, other materials, such as a polymer or a III-V compound semiconductor, may be used to form the waveguide core 12.

In an embodiment, the waveguide core 12 may be formed by patterning a layer of material with lithography and etching processes. In an embodiment, the waveguide core 12 may be formed by patterning the semiconductor material (e.g., single-crystal silicon) of the device layer of a silicon-on-insulator substrate. In an embodiment, the waveguide core 12 may be formed by patterning a deposited layer of a material (e.g., silicon nitride).

Figure 3:
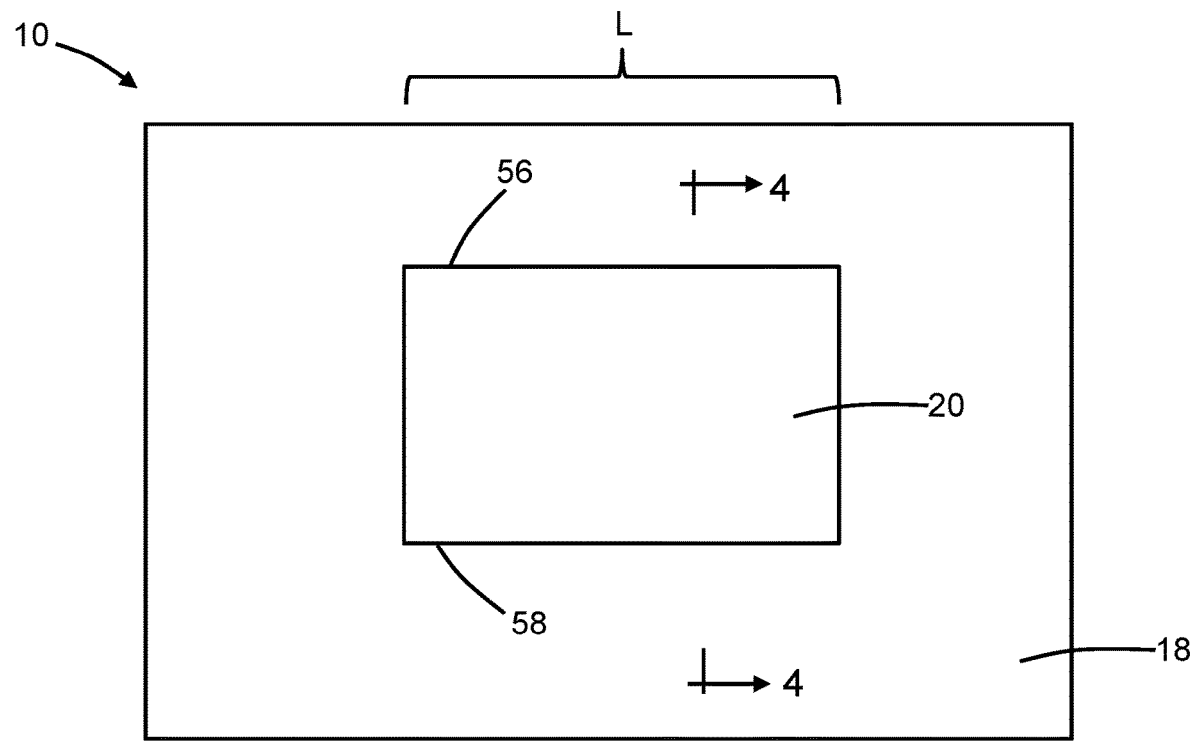
FIG. 3 is a top view of the structure at a fabrication stage of the processing method subsequent to FIG. 1.
Figure 4:
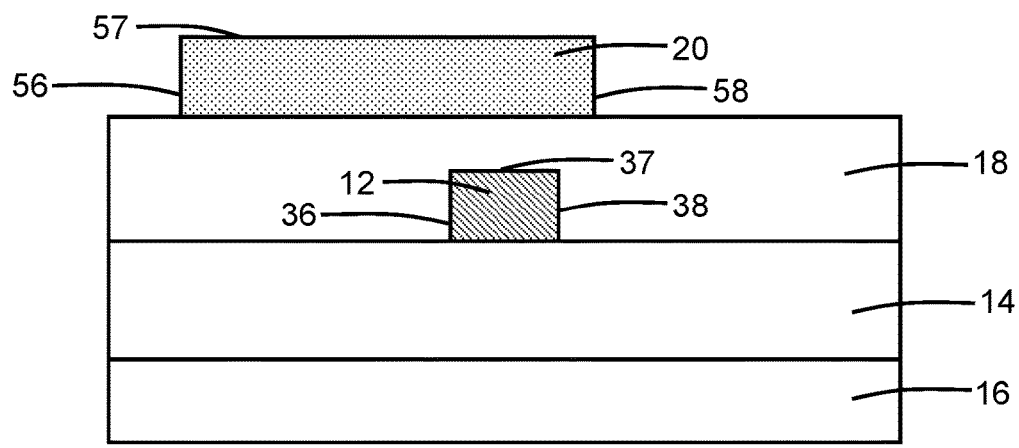
FIG. 4 is a cross-sectional view taken generally along line 4-4 in FIG. 3.

With reference to FIGS. 3, 4 in which like reference numerals refer to like features in FIGS. 1, 2 and at a subsequent fabrication stage, a dielectric layer 18 is formed over the waveguide core 12. In an embodiment, the waveguide core 12 may be embedded in the dielectric layer 18, which may be thicker than the waveguide core 12. The dielectric layer 18 may be comprised of a dielectric material, such as silicon dioxide, that is deposited and then planarized following deposition. The dielectric material constituting the dielectric layer 18 may have a refractive index that is less than the refractive index of the material constituting the waveguide core 12.

A layer 20 is positioned on the dielectric layer 18 and is located in a different elevation or level within the structure 10 than the waveguide core 12. The layer 20 may have a side surface 56, an opposite side surface 58, and a top surface 57 connecting the side surfaces 56, 58. In an embodiment, the side surfaces 56, 58 define sidewalls that may extend from the top surface 57 to the dielectric layer 18. In an embodiment, the side surfaces 56, 58 of the layer 20 may be aligned parallel to the side surfaces 36, 38 of the waveguide core 12. The layer 20, which has a length L, is positioned adjacent to a section of the waveguide core 12. In an embodiment, the layer 20 may have an overlapping arrangement with the adjacent section of the waveguide core 12. In an embodiment, the layer 20 may extend across both side surfaces 36, 38 of the waveguide core 12.

The layer 20 may be formed by depositing a layer on the dielectric layer 18 and patterning the deposited layer with lithography and etching processes. To that end, an etch mask may be formed by a lithography process over the deposited layer, and unmasked sections of the deposited layer may be etched and removed with an etching process, such as reactive ion etching. The dielectric material of the dielectric layer 18 is disposed between the layer 20 and the waveguide core 12.

In an embodiment, the layer 20 may be comprised of a tunable or active material having an index of refraction (i.e., refractive index) that can be tuned (i.e., varied) by the application of a stimulus, such as an electrical stimulus, an optical stimulus, or a thermal stimulus. In an embodiment, the layer 20 may be comprised of a material characterized by a refractive index that is reversibly variable by the stimulus among two or more different states characterized by significantly different refractive indices and optical absorption properties. In an embodiment, the refractive index of the active material may exhibit multiple different states in which the real parts and the imaginary parts of the refractive index are significantly different. In embodiments, the stimulus used to prompt the reversible variation between the different refractive index states may be heat from a resistive heater that supplies a temperature change, an electric field supplied by an applied voltage, an electrical current supplied by an applied voltage, or optical pumping by pump light supplied from an external laser.

In an embodiment, the active material contained in the layer 20 may be a conducting oxide, such as indium-tin oxide for which the real part and imaginary part of its refractive index may respectively be equal to about 2 and about 0 in one tuned state, and the real part and imaginary part of its refractive index may respectively be equal to about 1 and about 0.3 in a different tuned state. In an embodiment, the active material contained in the layer 20 may be a phase change material, such as vanadium oxide or germanium-antimony telluride. For example, vanadium oxide undergoes a reversible metal-insulator phase change between its metallic and insulating states of different refractive index near a temperature of 68° C. In an embodiment, the active material contained in the layer 20 may be a two-dimensional material, such as graphene or molybdenum disulphide. In an embodiment, the active material contained in the layer 20 may be an electro-optic polymer.

Figure 5:
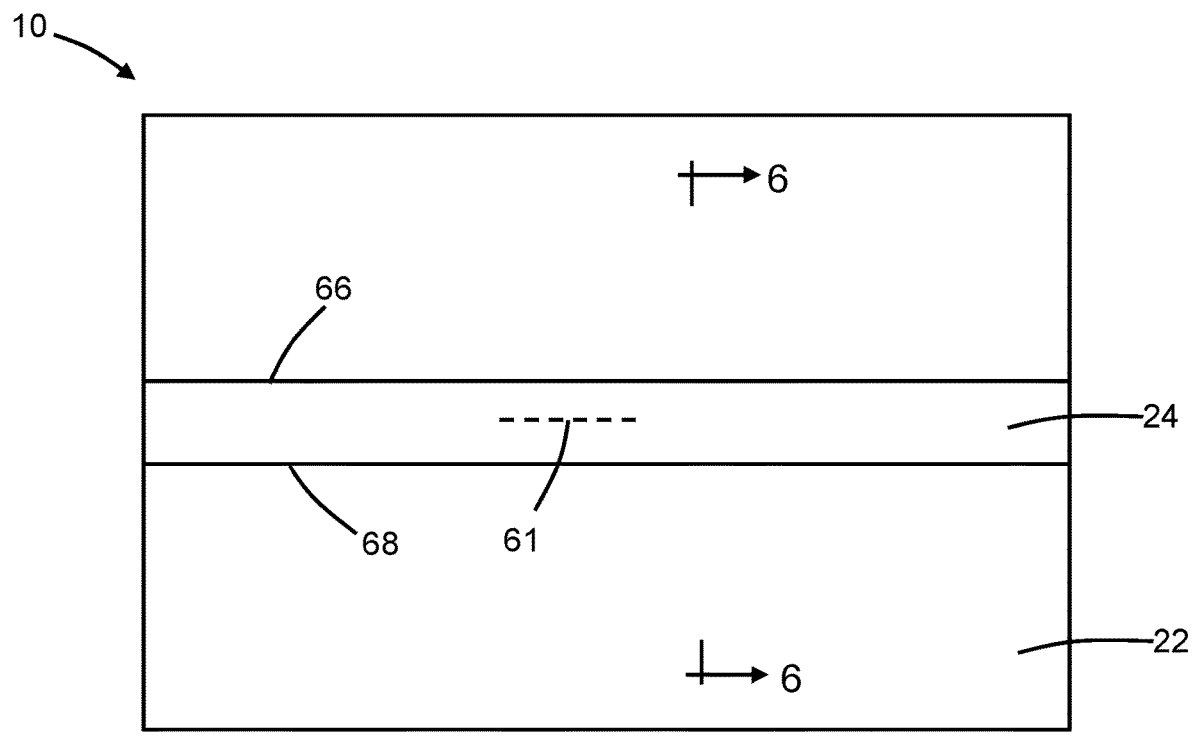
FIG. 5 is a top view of the structure at a fabrication stage of the processing method subsequent to FIG. 3.
Figure 6:
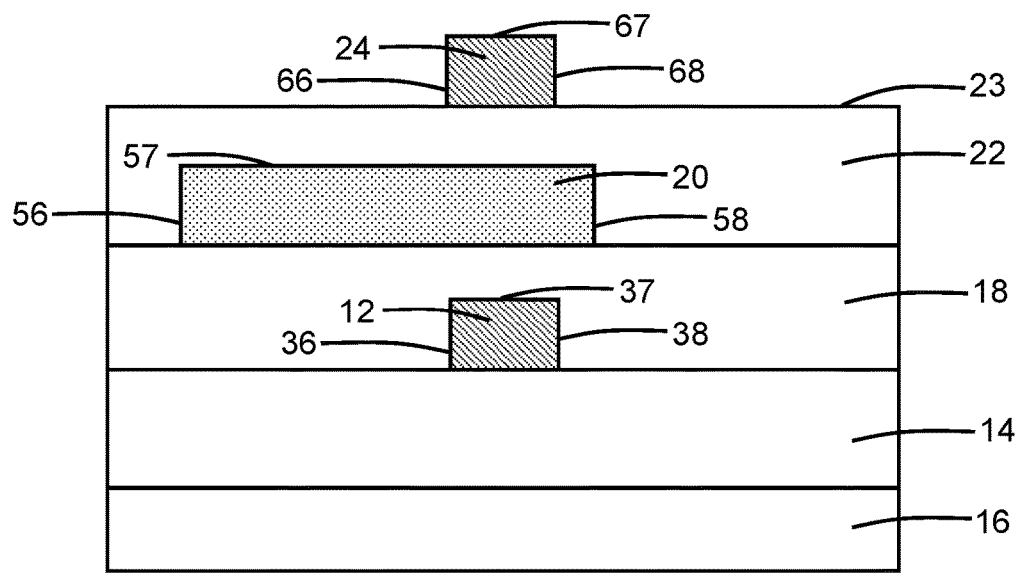
FIG. 6 is a cross-sectional view taken generally along line 6-6 in FIG. 5.

With reference to FIGS. 5, 6 in which like reference numerals refer to like features in FIGS. 3, 4 and at a subsequent fabrication stage, a dielectric layer 22 is formed over the layer 20. The dielectric layer 22 may be comprised of a dielectric material, such as silicon dioxide, that is deposited and then planarized following deposition. In an embodiment, the dielectric material constituting the dielectric layer 22 may have a refractive index that is less than the refractive index of the material constituting the layer 20 in at least one of its refractive index states. In an embodiment, the dielectric layer 22 may have a top surface 23 that is planar or substantially planar. In an embodiment, the layer 20 may be embedded in the dielectric layer 22, which may be thicker than the layer 20.

A waveguide core 24 is positioned on the dielectric layer 22 and is located in a different elevation or level within the structure 10 than the waveguide core 12 and in a different elevation or level within the structure 10 than the layer 20. The waveguide cores 12, 24 define a stacked waveguide core that is capable of guiding light propagating on a photonics chip. The layer 20 is positioned in a vertical direction between a level including the waveguide core 12 and a level including the waveguide core 24. The waveguide core 24 may be aligned along a longitudinal axis 61. The waveguide core 24 may have a side surface 66, an opposite side surface 68, and a top surface 67 connecting the side surfaces 66, 68. In an embodiment, the side surfaces 66, 68 define sidewalls that may extend from the top surface 67 to the dielectric layer 22. In an embodiment, the side surfaces 66, 68 of the waveguide core 24 may be aligned parallel to the side surfaces 56, 58 of the layer 20. The layer 20 is positioned adjacent to a section of the waveguide core 24. In an embodiment, the section of the waveguide core 24 may have an overlapping arrangement with the layer 20 such that the side surfaces 66, 68 of the waveguide core 24 are arranged between the side surfaces 56, 58 of the layer 20. The dielectric material of the dielectric layer 26 is disposed between the layer 20 and the waveguide core 24.

The waveguide core 24 may be comprised of a material having a refractive index that is greater than the refractive index of silicon dioxide. In an embodiment, the waveguide core 24 may be comprised of a different material than the waveguide core 12. In an embodiment, the waveguide core 24 may be comprised of a dielectric material, such as silicon nitride or silicon oxynitride. In an alternative embodiment, the waveguide core 24 may be comprised of a semiconductor material, such as polysilicon. In alternative embodiments, other materials, such as a polymer or a III-V compound semiconductor, may be used to form the waveguide core 24. In an embodiment, the waveguide core 24 may be formed by depositing a layer of its constituent material on the dielectric layer 22 and patterning the deposited layer with lithography and etching processes.

Figure 7:
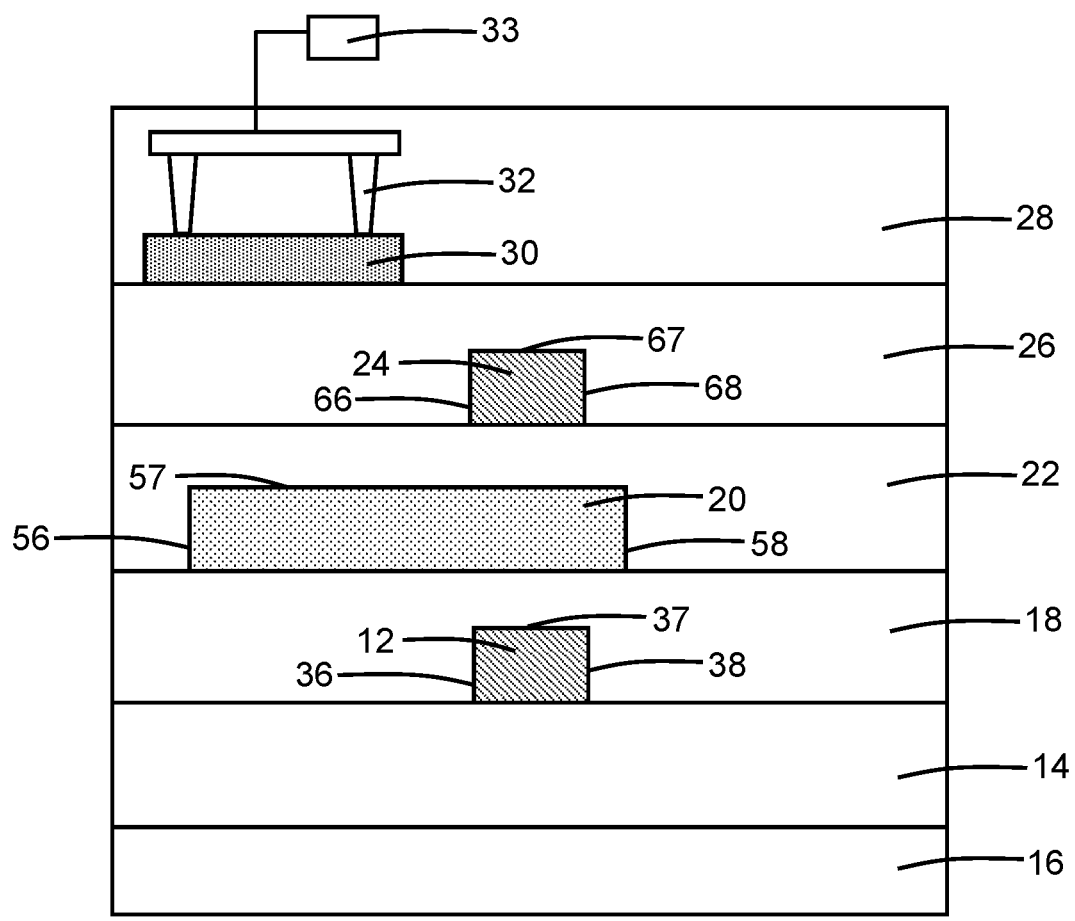
FIG. 7 is a cross-sectional view of the structure at a fabrication stage of the processing method subsequent to FIG. 5.

With reference to FIG. 7 in which like reference numerals refer to like features in FIG. 6 and at a subsequent fabrication stage, a dielectric layer 26 is formed over the waveguide core 24. In an embodiment, the waveguide core 24 may be embedded in the dielectric layer 26, which may be thicker than the waveguide core 24. The dielectric layer 26 may be comprised of a dielectric material, such as silicon dioxide, that is deposited and then planarized following deposition. In an embodiment, the dielectric material constituting the dielectric layer 26 may have a refractive index that is less than the refractive index of the material constituting the waveguide core 24.

A back-end-of-line stack 28 may be formed over the dielectric layer 26. The back-end-of-line stack 28 may include stacked dielectric layers in which each dielectric layer is comprised of a dielectric material, such as silicon dioxide, silicon nitride, tetraethylorthosilicate silicon dioxide, or fluorinated-tetraethylorthosilicate silicon dioxide.

In an embodiment, a heater 30 may be positioned above and adjacent to the layer 20. In the representative embodiment, the heater 30 is positioned in the back-end-of-line stack 28 proximate to the layer 20 and is offset in a lateral direction from the waveguide cores 12, 24. The heater 30 may be a resistive heating element comprised of a metal, such as nickel-chromium, tantalum nitride, nickel silicide, cobalt silicide, or titanium nitride, that is deposited and patterned. The heater 30 may be coupled by metal features 32 in the back-end-of-line stack 28 to a power supply 33 for powering the heater 30 to provide a temperature change prompting the refractive index change of the active material of the layer 20. During operation, heat is transferred from the powered heater 30 through the dielectric material of the back-end-of-line stack 28 to the layer 20. The temperature of the layer 20 may be varied above and below the state transition temperature by the selective application of heat as the stimulus to provide different refractive indices. The layer 20 may be offset in a lateral direction from the waveguide cores 12, 24, which permits the heater 30 and the metal features 32 to have a location in the back-end-of-line stack 28 that negligibly interferes with light propagating in the stacked waveguide core.

The waveguide core 12 and the waveguide core 24 may define a stacked waveguide core in which the waveguide core 12 and the waveguide core 24 cooperate to guide propagating light. The variation in the refractive index of the layer 20 may be effective to interfere with the optical mode of the propagating light in the stacked waveguide core so as to introduce a phase delay that is tunable (i.e., adjustable or variable) by changing the refractive index of the layer 20.

Figure 8:
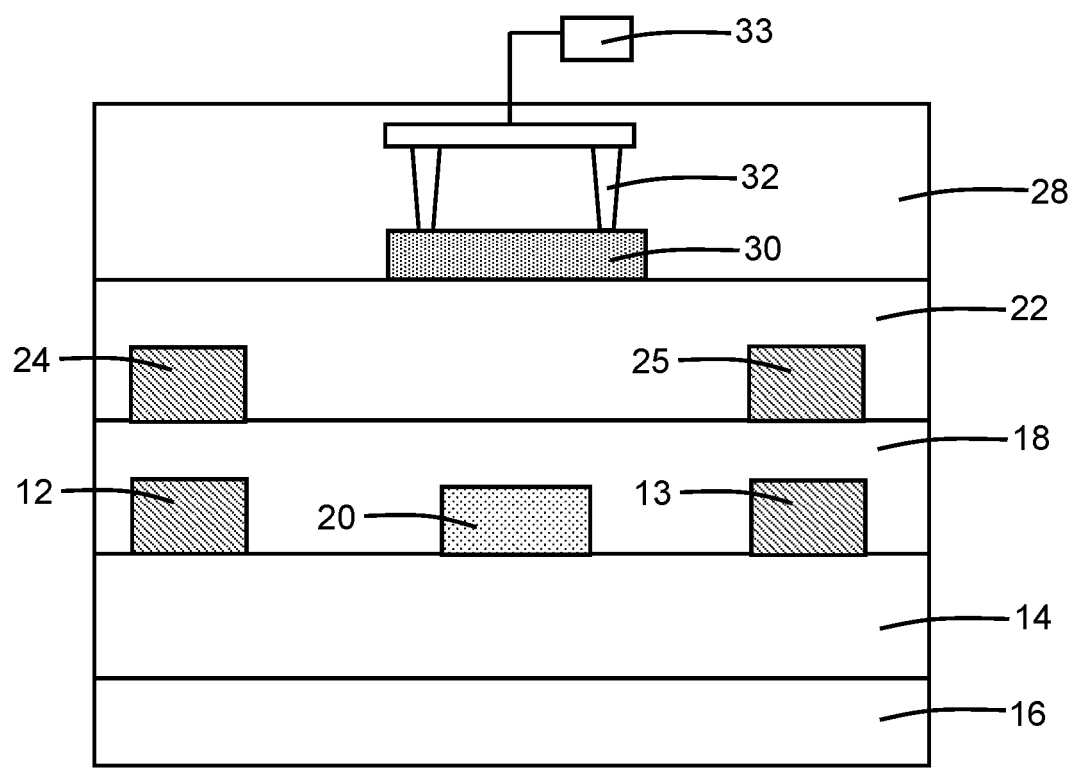
FIG. 8 is a cross-sectional view of a structure in accordance with alternative embodiments of the invention.

With reference to FIG. 8 and in accordance with alternative embodiments of the invention, the structure 10 may be modified to introduce a waveguide core 13 and a waveguide core 25 that are respectively similar to the waveguide core 12 and the waveguide core 24. The layer 20 may be positioned in a lateral direction between a stacked waveguide core including the waveguide cores 12, 24 and the stacked waveguide core including the waveguide cores 13, 25. The heater 30 is also positioned above the layer 20 and in a lateral direction between the different stacked waveguide cores.

Figure 9:
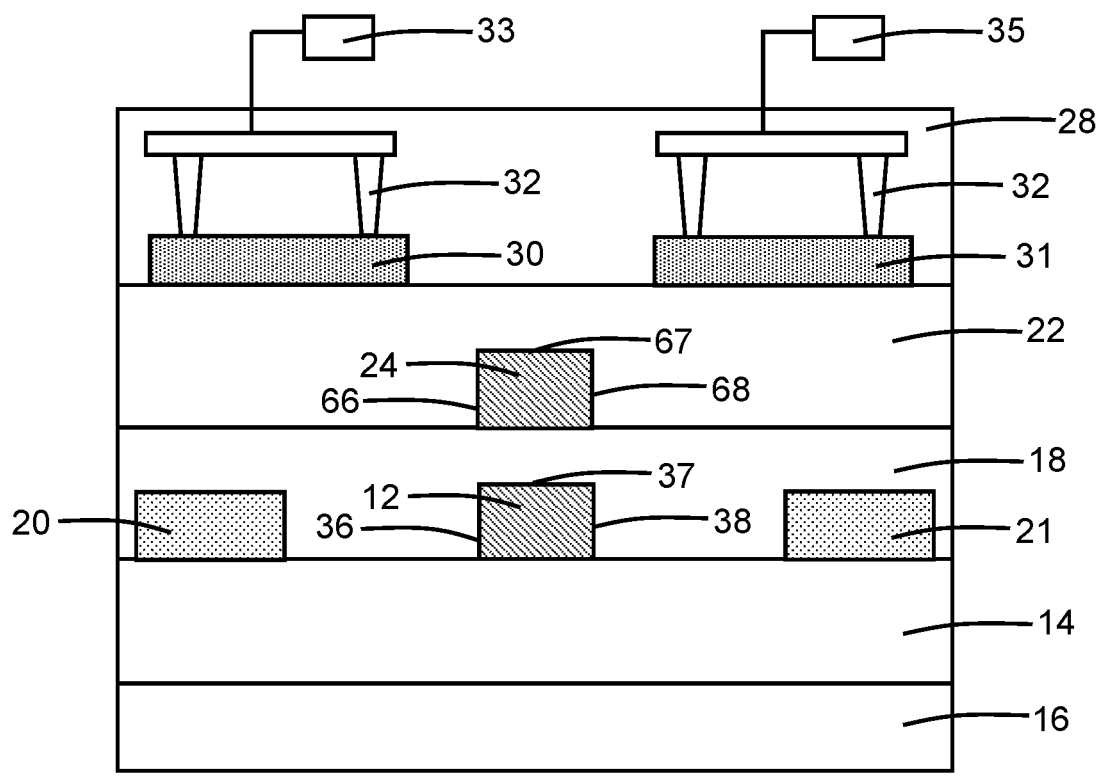
FIG. 9 is a cross-sectional view of a structure in accordance with alternative embodiments of the invention.

With reference to FIG. 9 and in accordance with alternative embodiments of the invention, the structure 10 may be modified to introduce another layer 21 similar to the layer 20 and to position the layers 20, 21 on the dielectric layer 14. In an embodiment, the layer 21 may be comprised of the same material as the layer 20. The stacked waveguide core including the waveguide core 12 and the waveguide core 24 is positioned in a lateral direction between the layer 20 and the layer 21. The layer 20 is spaced in a lateral direction from the side surface 36 of the waveguide core 12, and the layer 21 is spaced in a lateral direction from the side surface 38 of the waveguide core 12. In an embodiment, the layers 20, 21 may be positioned on the dielectric layer 14 and may be formed before the dielectric layer 18 is formed. The layers 20, 21 have non-overlapping arrangements with the waveguide cores 12, 24. The dielectric material of the dielectric layer 18 is positioned between the layer 20 and the waveguide core 12 and is also positioned between the layer 21 and the waveguide core 12.

A heater 31 similar to the heater 30 may be positioned above and adjacent to the layer 21. The heater 31 may be coupled by the metal features 32 in the back-end-of-line stack 28 to a power supply 35 for powering the heater 31 to provide a temperature change prompting the refractive index change of the active material of the layer 21. In an embodiment, both of the heaters 30, 31, when powered, may be used to heat both of the layers 20, 21. In an embodiment, the heater 30, when powered, may be used to primarily heat the layer 20, and the heater 31, when powered, may be used to primarily heat the layer 21.

Figure 10:
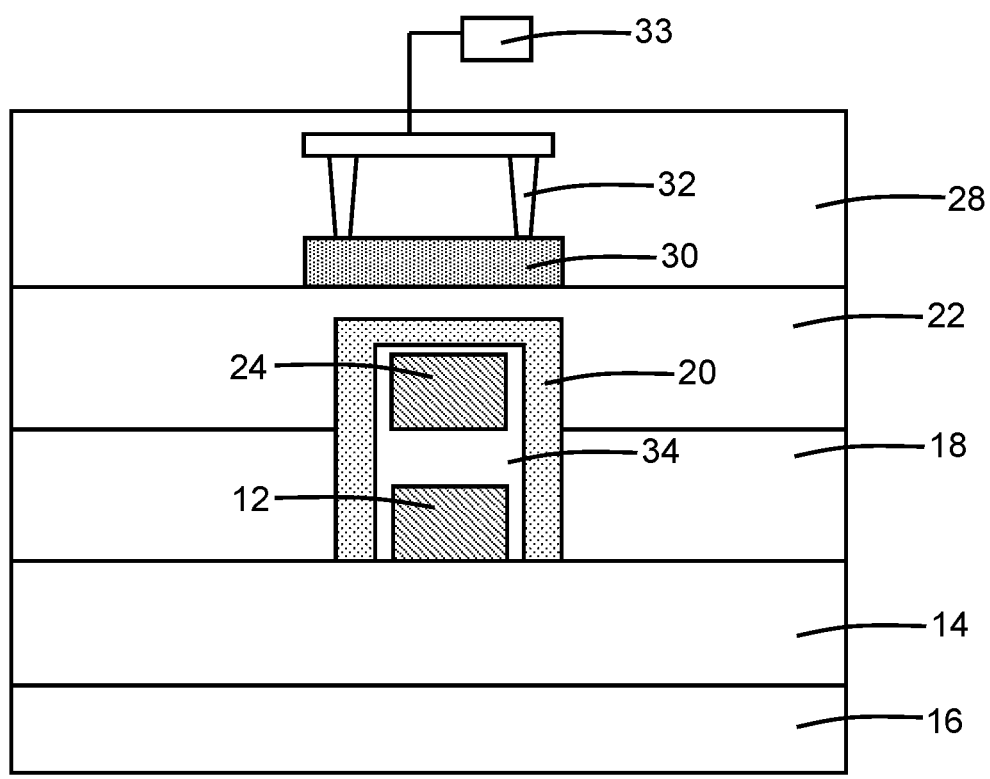
FIG. 10 is a cross-sectional view of a structure in accordance with alternative embodiments of the invention.

With reference to FIG. 10 and in accordance with alternative embodiments of the invention, the layer 20 may be wrapped about both of the waveguide cores 12, 24 as a conformally-deposited layer. A dielectric layer 34 may separate the layer 20 from the waveguide cores 12, 24.

Figure 11:
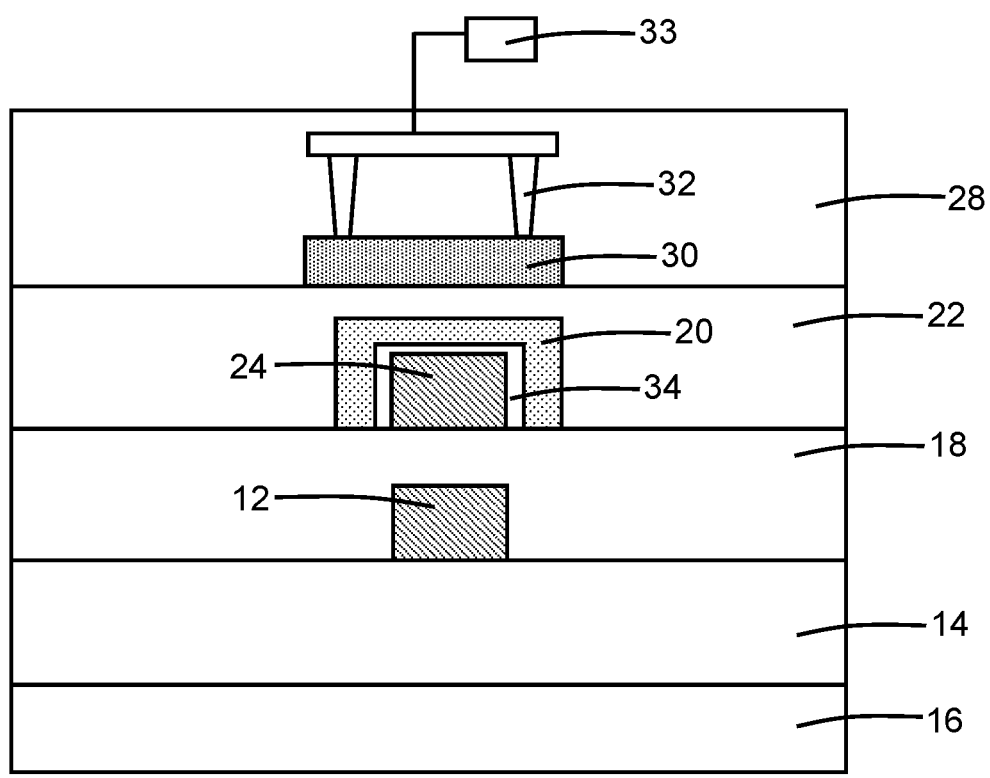
FIG. 11 is a cross-sectional view of a structure in accordance with alternative embodiments of the invention.

With reference to FIG. 11 and in accordance with alternative embodiments of the invention, the layer 20 may be wrapped about the waveguide core 24 as a conformally-deposited layer and not wrapped about the waveguide core 12. The dielectric layer 34 may separate the layer 20 from the waveguide core 24.

Figure 12:
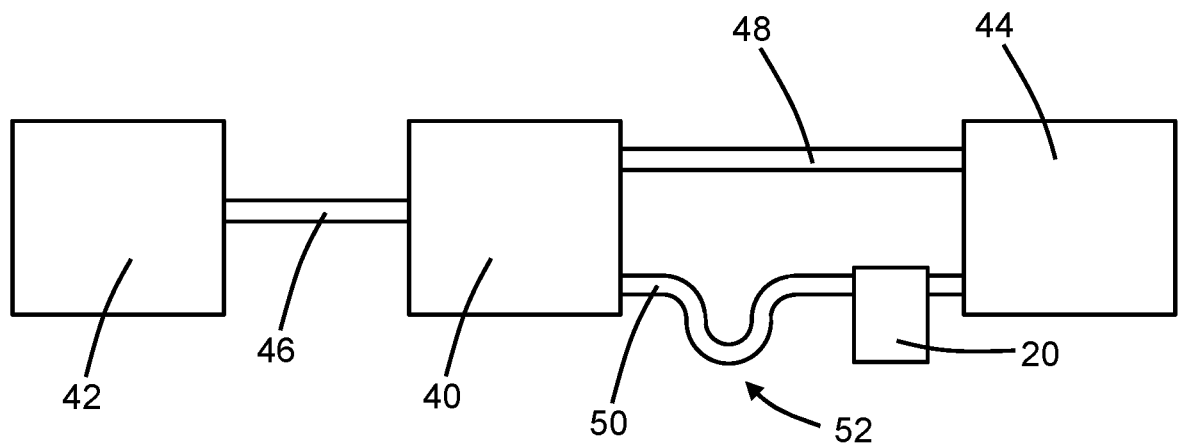
FIG. 12 is a diagrammatic top view of a structure in accordance with alternative embodiments of the invention.

With reference to FIG. 12 and in accordance with alternative embodiments of the invention, the layer 20 may be used in conjunction with a polarization splitter rotator 40 that couples a set of photonic components 42 to another set of photonic components 44. The polarization splitter rotator 40 may receive light of multiple polarizations at an input from a waveguide core 46, rotate the polarization of a component of the light, and split the light between a pair of waveguide cores 48, 50 providing distinct optical paths connecting outputs of the polarization splitter rotator 40 with the photonic components 44. For example, the polarization splitter rotator 40 may receive light of the fundamental transverse magnetic (TM0) mode) and the fundamental transverse electric (TE0) mode, output the light of TE0 mode to the waveguide core 48, and rotate the light of TM0 mode and output light of TE0 mode to the waveguide core 50.

In an embodiment, the waveguide core 50 may be a stacked waveguide core including the waveguide cores 12, 24, and the tunable delay line may deploy the layer 20 adjacent to a section of the waveguide core 50 in the output path. The layer 20 may be used to compensate for the group/time delay between the light propagating in the waveguide core 50 and light in the waveguide core 48. In an embodiment, the waveguide core 50 may include a static phase delay section 52 that increases the physical length of the waveguide core 50 relative to the waveguide core 48 and thereby introduces a fixed group/time delay for the light propagating in the waveguide core 50. The layer 20 provides the ability to introduce a tunable group/time delay for the light propagating in the waveguide core 50.

Figure 13:
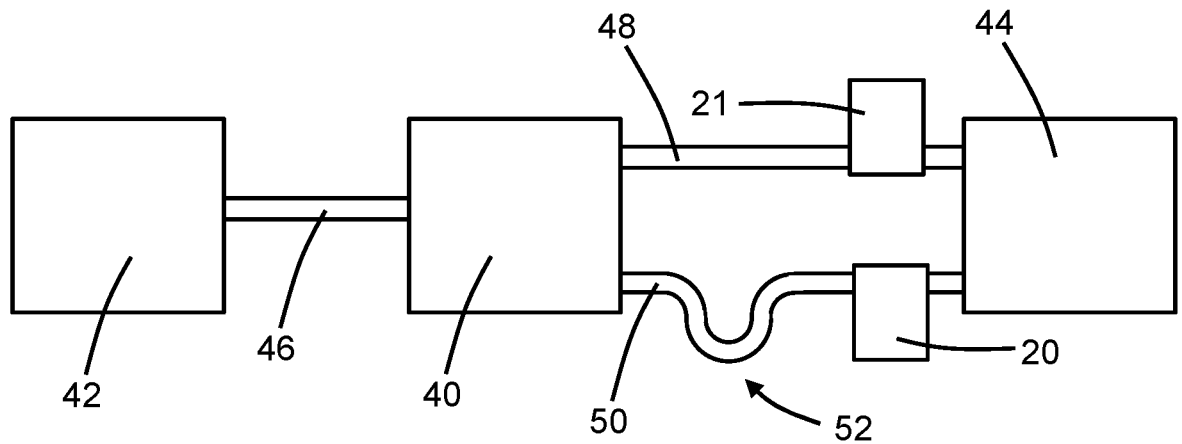
FIG. 13 is a diagrammatic top view of a structure in accordance with alternative embodiments of the invention.

With reference to FIG. 13 in which like reference numerals refer to like features in FIG. 12 and in accordance with alternative embodiments of the invention, the waveguide core 48 may be a stacked waveguide core including the waveguide cores 12, 24, and the layer 21 may be deployed adjacent to a section of the waveguide core 48 in the other output path such that the group/time delay can be tuned for the light propagating in either or both of the waveguide cores 48, 50.

Figure 14:
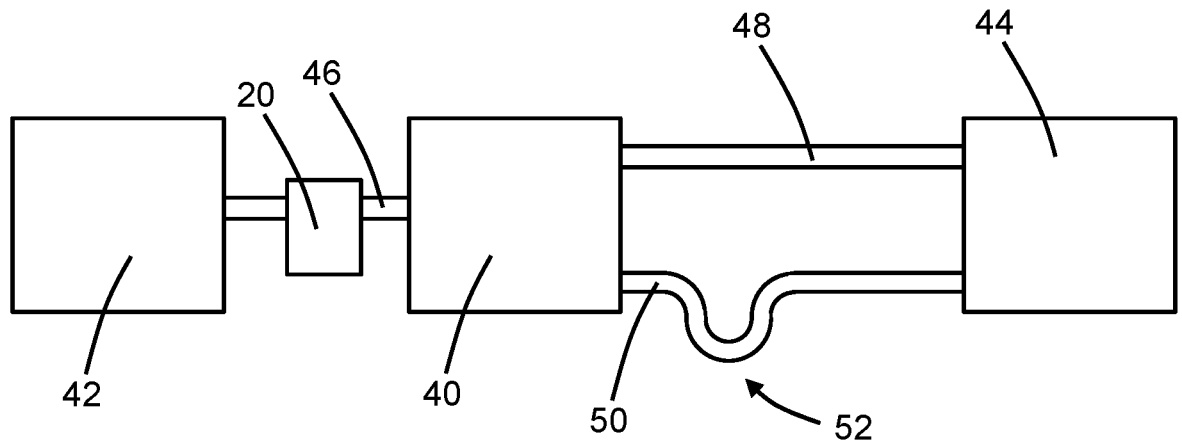
FIG. 14 is a diagrammatic top view of a structure in accordance with alternative embodiments of the invention.

With reference to FIG. 14 and in accordance with alternative embodiments of the invention, the waveguide core 46 may be a stacked waveguide core including the waveguide cores 12, 24, and the layer 20 may be deployed adjacent to a section of the waveguide core 46 defining the input path to the polarization splitter rotator 40. The layer 20 may be used to tune the group/time delay for the light propagating in the waveguide core 46 before the light enters the input to polarization splitter rotator 40.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a first stacked waveguide core including a first waveguide core and a second waveguide core stacked with the first waveguide core; and
a first layer adjacent to the first stacked waveguide core, the first layer comprising a first material having a refractive index that is variable in response to a stimulus,
wherein the first waveguide core comprises a second material, and the second waveguide core comprises a third material different from the second material.

2. The structure of claim 1 wherein the first layer is positioned in a vertical direction between the first waveguide core and the second waveguide core.

3. The structure of claim 2 wherein the first layer overlaps with the first waveguide core.

4. The structure of claim 2 wherein the second waveguide core overlaps with the first layer.

5. The structure of claim 2 further comprising:
a first dielectric layer including dielectric material disposed between the first waveguide core and the first layer; and
a second dielectric layer including dielectric material disposed between the second waveguide core and the first layer.

6. The structure of claim 1 further comprising:
a second stacked waveguide core including a third waveguide core positioned adjacent to the first waveguide core in a lateral direction and a fourth waveguide core positioned adjacent to the second waveguide core in the lateral direction, the fourth waveguide core stacked with the third waveguide core,
wherein the first layer is positioned in the lateral direction between the first waveguide core of the first stacked waveguide core and the third waveguide core of the second stacked waveguide core.

7. The structure of claim 1 wherein the first layer is spaced in a lateral direction from the first stacked waveguide core.

8. The structure of claim 7 further comprising:
a second layer adjacent to the first stacked waveguide core, the second layer comprised of the first material.

9. The structure of claim 8 wherein the first stacked waveguide core is positioned in the lateral direction between the first layer and the second layer.

10. The structure of claim 1 further comprising:
a polarization rotator splitter having an input and an output;
wherein the first stacked waveguide core is coupled to the input of the polarization rotator splitter.

11. The structure of claim 1 further comprising:
a polarization rotator splitter having an input and a first output;
wherein the first stacked waveguide core is coupled to the first output of the polarization rotator splitter.

12. The structure of claim 11 wherein the polarization rotator splitter has a second output, and further comprising:
a third waveguide core coupled to the second output,
wherein the first stacked waveguide core includes a phase delay section that increases a first length of the first stacked waveguide core relative to a second length of the third waveguide core.

13. The structure of claim 1 wherein the first material comprises a conducting oxide, a phase change material, a two-dimensional material, or an electro-optic polymer.

14. The structure of claim 1 wherein the first material is different from the second material and the third material.

15. The structure of claim 1 further comprising:
a dielectric layer over the first waveguide core, the dielectric layer having a top surface that is substantially planar,
wherein the first layer is positioned on the top surface of the dielectric layer.

16. The structure of claim 1 wherein the first layer wraps around the first stacked waveguide core.

17. The structure of claim 1 wherein the first layer wraps around the second waveguide core of the first stacked waveguide core.

18. The structure of claim 1 further comprising:
a heater proximate to the first layer, the heater configured to transfer heat as the stimulus to the first layer.

19. The structure of claim 1 wherein the second material comprises silicon, and the third material comprises silicon nitride.

20. A method comprising:
forming a stacked waveguide core including a first waveguide core and a second waveguide core stacked with the first waveguide core; and
forming a layer adjacent to the stacked waveguide core, wherein the layer comprises a material having a refractive index that is variable in response to a stimulus,
wherein the first waveguide core comprises a second material, and the second waveguide core comprises a third material different from the second material.

\* \* \* \* \*